United States Patent
Moroo et al.

(10) Patent No.: US 9,483,320 B2
(45) Date of Patent: Nov. 1, 2016

(54) COMPUTING APPARATUS, METHOD OF CONTROLLING COMPUTING APPARATUS, AND COMPUTER-READABLE STORAGE MEDIUM HAVING PROGRAM FOR CONTROLLING COMPUTING APPARATUS STORED THEREIN TO MOVE PROCESSES TO A SAME PROCESSOR CORE FOR EXECUTION

(71) Applicant: FUJITSU LIMITED, Kawasaki-shi, Kanagawa (JP)

(72) Inventors: Jun Moroo, Isehara (JP); Yoshihiro Matsuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/628,320

(22) Filed: Feb. 23, 2015

(65) Prior Publication Data
US 2015/0261566 A1 Sep. 17, 2015

(30) Foreign Application Priority Data

Mar. 13, 2014 (JP) .................. 2014-050266

(51) Int. Cl.
G06F 9/46 (2006.01)
G06F 9/50 (2006.01)

(52) U.S. Cl.
CPC .................. *G06F 9/5088* (2013.01)

(58) Field of Classification Search
None
See application file for complete search history.

(56) References Cited

U.S. PATENT DOCUMENTS

| 6,654,780 | B1 | 11/2003 | Eilert et al. |
| 8,954,968 | B1* | 2/2015 | Pohl ..................... G06F 11/3409 718/100 |
| 2004/0020389 | A1* | 2/2004 | Holmstead ............. G06K 15/00 101/484 |
| 2005/0089053 | A1* | 4/2005 | Zhu ..................... H04M 3/5232 370/412 |
| 2009/0165012 | A1* | 6/2009 | Corona ................. G06F 9/5044 718/105 |
| 2010/0191912 | A1* | 7/2010 | Williamson ........ G06F 12/0802 711/122 |
| 2011/0276986 | A1* | 11/2011 | Kamath ................ G06F 3/1203 719/328 |

FOREIGN PATENT DOCUMENTS

| JP | 05-204667 A | 8/1993 |
| JP | 10-289116 A | 10/1998 |
| JP | 2013-69204 A | 4/2013 |

\* cited by examiner

*Primary Examiner* — Adam Lee
(74) *Attorney, Agent, or Firm* — Fujitsu Patent Center (57) ABSTRACT

A computing apparatus for optimizing process wait time, including a plurality of computing units, is disclosed. When there is any process having a maximum wait time, among processes that have been queued, which has the wait time exceeding a predetermined value, and when processes in a particular process type among different process types, are being executed or have been queued in all of the computing units, all processes in that particular process type, are executed on at least one of the computing units, based on a list of all of processes. A method of controlling a computing apparatus and a computer-readable storage medium are also disclosed.

8 Claims, 11 Drawing Sheets

COMPUTING APPARATUS, METHOD OF CONTROLLING COMPUTING APPARATUS, AND COMPUTER-READABLE STORAGE MEDIUM HAVING PROGRAM FOR CONTROLLING COMPUTING APPARATUS STORED THEREIN TO MOVE PROCESSES TO A SAME PROCESSOR CORE FOR EXECUTION

CROSS-REFERENCE TO RELATED APPLICATION

This application is based upon and claims the benefit of priority of the prior Japanese Patent application No. 2014-050266, filed on Mar. 13, 2014, the entire contents of which are incorporated herein by reference.

FIELD

The embodiment discussed herein is related to a computing apparatus, a method of controlling a computing apparatus, and a non-transitory computer-readable storage medium having a program for controlling a computing apparatus stored therein.

BACKGROUND

In recent years, a multi-core CPU configuration wherein multiple cores are provided in a single central processing unit (CPU) has been widely utilized for information processing apparatuses.

Cores are the center of a CPU, and logic circuits for computations are implemented.

In a CPU in such a multi-core configuration, cores generally have similar configurations.

In a multi-core CPU, multiple processes can be executed in number which is equal to the number of cores provided in the CPU.

In the meantime, increasing the computation speed is the top-priority matter in high-performance computing (HPC) systems, such as super computers. An operating system (OS) is required for operating an information processing apparatus, but a portion of the CPU power is consumed for executing the operating system. Hence, an operating system is one of the factors which reduce the computation speed, and thus hinder high-speed computations.

To address this issue, in recent years, as CPUs for HPCSs, CPUs have been used which include multiple types of cores, i.e., cores for executing calculations (hereinafter, referred to as "computation core") and core for executing an operating system (hereinafter, referred to as OS cores). Computation cores for executing calculations, only execute calculation processes that is executed by users on an information processing apparatus. In contrast, OS cores for executing the operating system, executes house keeping processes of the system, including input/output (IO) operations, such as reads from and/or writes to files required for calculations by the computation cores and telecommunications, monitors for the system operations, and management of the calculation resources.

The numbers of respective cores provided in a CPU vary, but typically, 16 computation cores and two OS cores are provided, for example.

When computation cores want to execute disk accesses, the computation cores issue IO requests. The IO requests from the computation cores are appropriately distributed among the OS cores by a load balancer in the operating system.

As an example, the computation cores cause a large number of IOs (e.g., disk accesses). In such a case, the OS cores are occupied by the IO processes for process of the IOs, and processes other than the IO processes are held waited until all of the IO processes are completed. In other words, such processes other than the IO processes are being waited.

However, such processes that are being waited include processes which are necessary for operation of the operating system and the system, and a long wait may negatively affect the operation of the information processing apparatus.

In order to execute such processes while minimizing the wait time, it is desirable to prevent processing time of OS cores (resources) from being occupied by processes in a particular type, such as IO processes.

SUMMARY

According to an aspect of the embodiments, a computing apparatus is provided, comprising: a plurality of computing units; a processing state information obtaining unit that obtains respective processing state information for processes being executed or placed into wait for execution for the plurality of computing units; and a processing migrating unit that, when there is any process having a maximum wait time, among the processes that have been placed into wait for execution, has the wait time exceeding a predetermined value, and when processes in a particular type are being executed or placed into wait for execution in all of the plurality of computing units, allows all process in the particular type, to be executed on at least one of the plurality of computing units, based on the processing state information obtained by the processing state information obtaining unit.

Furthermore, a method of controlling a computing apparatus comprising a plurality of computing apparatuses is provided, the method comprising: obtaining respective processing state information for processes being executed or placed into wait for execution for the plurality of computing units; and when there is any process having a maximum wait time, among the processes that have been placed into wait for execution, has the wait time exceeding a predetermined value, and when processes in a particular type are being executed or placed into wait for execution in all of the plurality of computing units, allowing all process in the particular type, to be executed on at least one of the plurality of computing units, based on the obtained processing state information.

Furthermore, a non-transitory computer-readable storage medium is provided, having a program for controlling a computing apparatus stored therein, the program causes a computing apparatus comprising a plurality of computing apparatuses to: obtain respective processing state information for processes being executed or placed into wait for execution for the plurality of computing units; and when there is any process having a maximum wait time, among the processes that have been placed into wait for execution, has the wait time exceeding a predetermined value, and when processes in a particular type are being executed or placed into wait for execution in all of the plurality of computing units, allow all process in the particular type, to be executed on at least one of the plurality of computing units, based on the obtained processing state information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

A computing apparatus, a method of controlling a computing apparatus, and a non-transitory computer-readable storage medium having a program for controlling a computing apparatus stored therein, as an example of embodiments, will be described with reference to the drawings. Note that the embodiments discussed herein are merely exemplary, and it is not intended that various modifications and applications of the teachings not explicitly described are not omitted. In other words, the embodiments may be modified, within the scope of the spirit of the embodiments (such as combinations of embodiments and modifications).

(A) First Embodiment

First, a configuration of an information processing apparatus (computing apparatus) 1 will be described with reference to FIGS. 1-5.

Figure 1:
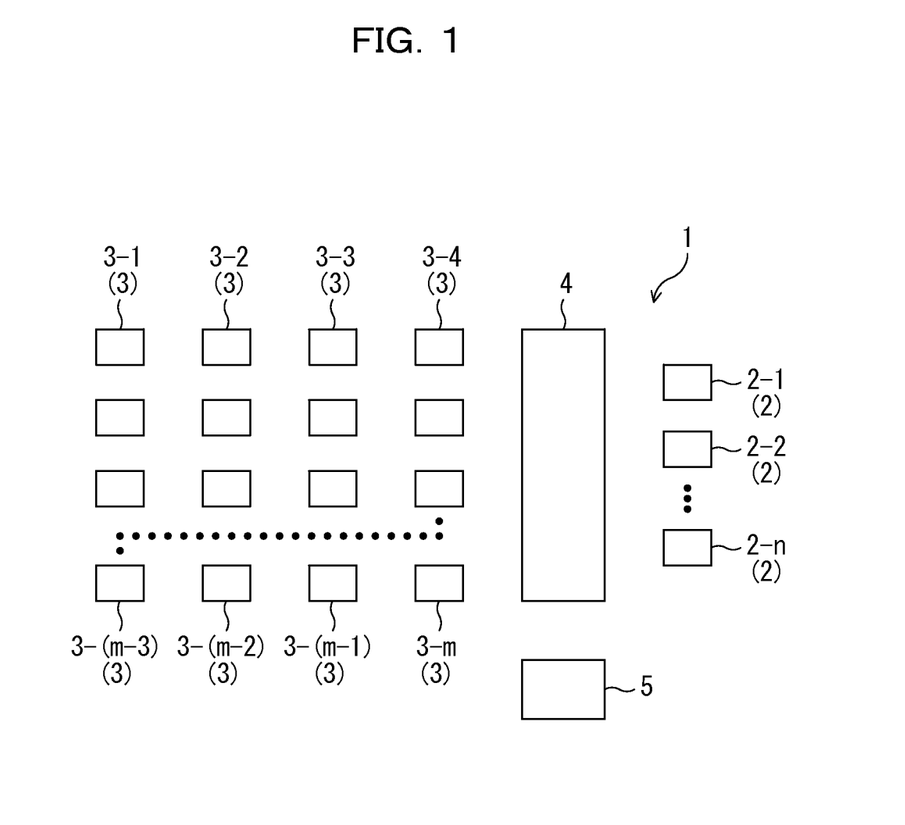
FIG. 1 is a diagram schematically illustrating a hardware configuration of an information processing apparatus as an example of a first embodiment.

FIG. 1 is a diagram schematically illustrating a hardware configuration of the information processing apparatus 1 a as an example of a first embodiment.

The information processing apparatus 1 includes OS cores 2-1 to 2-$n$ ($n$ is an integer of 2 or greater), computation cores (computing units) 3-1 to 3-$m$ ($m$ is an integer of 2 or greater), a cache memory 4, and a main memory 5.

The OS cores 2-1 to 2-$n$ perform house keeping operations for the system, including monitoring of system operations including IO operations, such as reads from and/or writes to files required for computations for the computation cores 3-1 to 3-$m$ (described later), communications, and management for processing of calculation resources.

In addition, the OS cores 2-1 to 2-$n$ function as a process relocation unit 11 (described later), by executing a control program stored in a storage apparatus (not illustrated).

The computation cores 3-1 to 3-$m$ perform computations executed on the information processing apparatus 1. The computation cores 3-1 to 3-$m$ cause the OS cores 2-1 to 2-$n$ to execute operations (IO operations and administrations) other than their own computations, by issuing a request. A request from the computation cores 3-1 to 3-$m$ is appropriately distributed to execution queues (not illustrated) in the OS cores 2-1 to 2-$n$, by a load balancer in an operating system (not illustrated) of the information processing apparatus 1. Each OS cores 2 sequentially handles requests queued in its own execution queue.

The main memory 5 is a storage apparatus that temporarily stores a program executed by the OS cores 2-1 to 2-$n$ and the computation cores 3-1 to 3-$m$, and various types of data obtained through operations executed by the OS cores 2-1 to 2-$n$ and the computation cores 3-1 to 3-$m$. A random access memory (RAM) and other types of memory can be used as the main memory 5.

The cache memory 4 is a high-speed memory that is used by the OS cores 2-1 to 2-$n$ and the computation cores 3-1 to 3-$m$ for temporarily storing data and a program to be stored in the main memory 5, when the data or the program is read from the main memory 5. A static RAM (SRAM) and other types of memory can be used as the cache memory 4.

Note that, hereinafter, when referring to a specific one of multiple OS cores, reference symbols 2-1 to 2-$n$ are used, whereas a reference symbol 2 is used when referring to any of OS cores.

Further, hereinafter, when referring to a specific one of multiple computation cores, reference symbols 3-1 to 3-$m$ are used, whereas a reference symbol 3 is used when referring to any of computation cores.

As an example, two OS cores 2 and 16 computation cores 3 ($m$=16) are provided, and the OS cores 2-1 and 2-2 and the computation cores 3-1 to 3-16 are manufactured on a single CPU (not illustrated).

Figure 2:
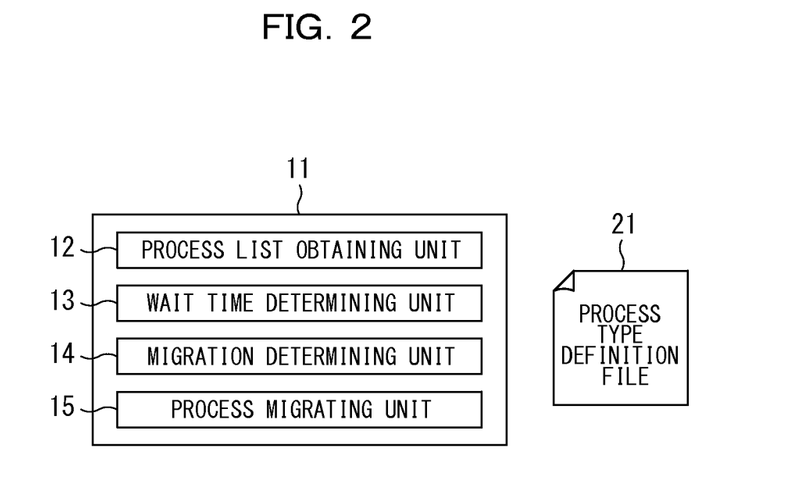
FIG. 2 is a diagram illustrating a functional configuration of a process relocation unit as an example of the first embodiment.

FIG. 2 is a diagram illustrating a functional configuration of the process relocation unit 11 of as an example of the first embodiment.

When the execution wait time of a process for the OS cores 2 is extended, and when processes in a particular type are being executed or placed into wait for execution in all of the OS cores 2 in the information processing apparatus 1, the process relocation unit 11 allows all of the processes in that type to be executed on at least one particular OS core 2. Specifically, the process relocation unit 11 allows all of the processes in that type to be executed on at least one particular OS core 2, by modifying entries queued in an execution queue (not illustrated) in each OS core 2.

Note that, hereinafter, the expression "causing a particular process to be executed on a particular OS core 2" may also be referred to as "migrating the process to the OS core 2" or "a migration of the process".

Now, a process migration processing by the process relocation unit 11 will be described with reference to FIGS. 3 and 4.

Figure 3:
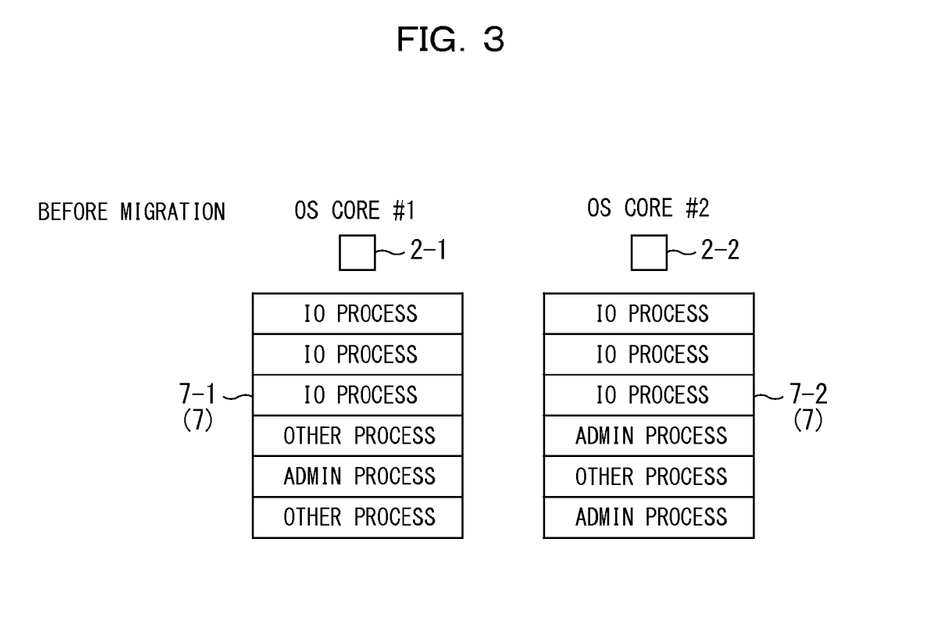
FIG. 3 is a diagram illustrating an example of the status prior to processing by the process relocation unit as an example of the first embodiment.

FIG. 3 is a diagram illustrating an example of the status prior to processing by the process relocation unit 11 as an example of the first embodiment. FIG. 4 is a diagram illustrating an example of the status after the processing by the process relocation unit 11 as an example of the first embodiment.

Figure 4:
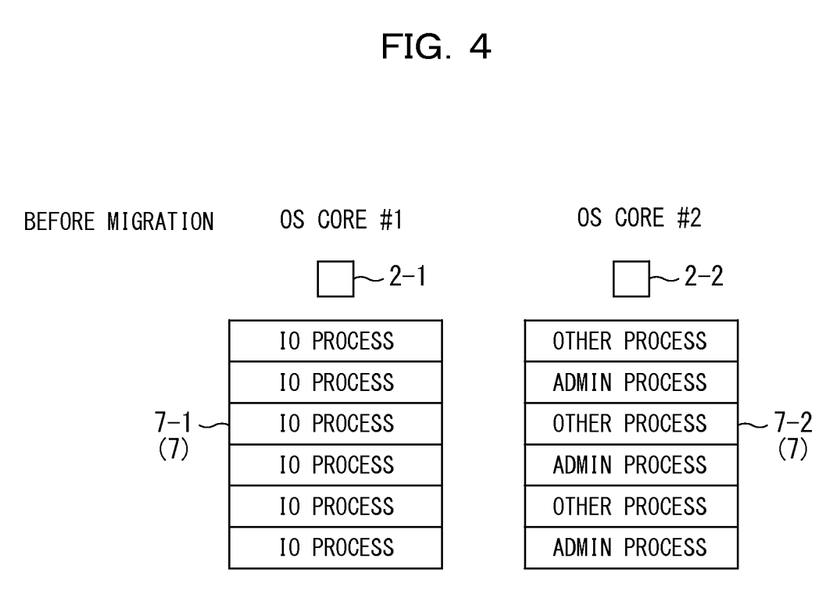
FIG. 4 is a diagram illustrating an example of the status after the processing by the process relocation unit as an example of the first embodiment.

The OS cores 2-1 and 2-2 and the corresponding process lists 7-1 and 7-2 are illustrated in FIGS. 3 and 4.

The process lists 7-1 and 7-2 are depicted merely for the purpose of illustration, and are illustrated not the ones actually generated by the OS cores 2-1 and 2-2.

In the process lists 7-1 and 7-2, the processes listed on the top are the processes that are being executed on the OS cores 2-1 and 2-2. The second and subsequent processes on the list are processes that are placed into wait for execution, arranged in the descending order of the creation date and time of the processes.

In the example in FIG. 3, the respective three IO processes are being executed or placed into wait for execution on the OS core 2-1 (OS core #1) and the OS core 2-2 (OS core #2).

In such a case, as depicted in FIG. 4, the process relocation unit 11 migrates the IO processes to at least one particular OS core 2 (OS core #1, in the example in FIG. 4). As a result, processes other than those IO processes can be executed, without being placed into wait for execution on other OS cores 2.

The process relocation unit (load balancing unit) 11 includes a process list obtaining unit (list obtaining unit) 12, a wait time determining unit 13, a migration determining unit 14, and a process migrating unit (processing migrating unit) 15.

The process list obtaining unit 12 obtains a list (processing state information) of all processes (that are being executed or placed into wait for execution on the OS cores 2) of all OS cores 2 present in the information processing apparatus 1. The list includes information on process IDs, creation date and time, and the statuses, of the process, for example.

For example, if the information processing apparatus 1 executes a UNIX® operating system, the process list obtaining unit 12 can obtain a list of processes by executing ps command. The process list obtaining unit 12 can also obtain a process list on another operating system, by means of similar techniques.

Note that the process list obtaining unit 12 may obtain a separate process list for each OS core 2, or a single process list for all OS cores 2.

The wait time determining unit 13 determines whether or not there is any process having a maximum wait time exceeds a predetermined threshold (e.g., ten minutes), among all processes of the OS cores 2, based on the process creating time in the process list obtained by the process list obtaining unit 12. The threshold is appropriately set by a system administration and other users, depending on the configuration and the operation status.

The wait time determining unit 13 determines the wait time for a process, by comparing current time and the creation date and time of the process, for example.

The migration determining unit 14 determines whether or not processes in the same type are present in all OS cores 2, based on the process list obtained by the process list obtaining unit 12.

Three types of processes: "IO process", "administration process", and "other processes" are used in an example of this first embodiment.

The migration determining unit 14 determines the process type of each process, based on a process type definition file 21, which will be described later.

An IO process is a process for executing communications with other information processing apparatuses external to the information processing apparatus 1, such as accesses to disks (not illustrated).

An administration process is a process for a system administration, such as an alive confirmation process that confirms whether the OS cores 2, the computation core 3, the cache memory 4, and the main memory 5 (which are referred to as "nodes") are alive, and communicating the status of each node for a monitoring unit of the operating system.

Other processes may include a clock interruption process, a process for communication between OS cores 2, and a user definition process. Any other processes that are not defined in the process type definition file 21 are also referred to as other processes.

As used herein, the term "process" includes administration processes that is executed in background, such as daemon.

When it is determined by the migration determining unit 14 that processes in the same type are present in all OS cores 2, the process migrating unit 15 allows all of the processes in that type to be executed on at least one particular OS core 2.

Upon migration of processes, the process migrating unit 15 selects destination OS core(s) 2 for the processes such that the count of processes to be migrated is minimized. If there are multiple destination candidate OS cores 2 having the same count of processes to be migrated, the process migrating unit 15 selects the OS core 2 having the smallest ID (the OS cores 2-1, in the example in FIG. 1), as a destination, for example.

Note that the process migrating unit 15 migrates a process between OS cores 2, by modifying entries queued in an execution queue (not illustrated) of each OS core 2.

The process type definition file 21 is a file that defines a process type of every process executed on the OS cores 2.

The process type definition file 21 includes a name of a process (e.g., print), and a process type of that process (e.g., "IO process"), for example.

The process type definition file 21 is created by a system administration and other users of the information processing apparatus 1, and is stored in a hard disk drive (HDD, not illustrated) in advance, for example.

Next, the processing by the process relocation unit 11 will be described in more detail with reference to a flowchart in FIG. 5.

Figure 5:
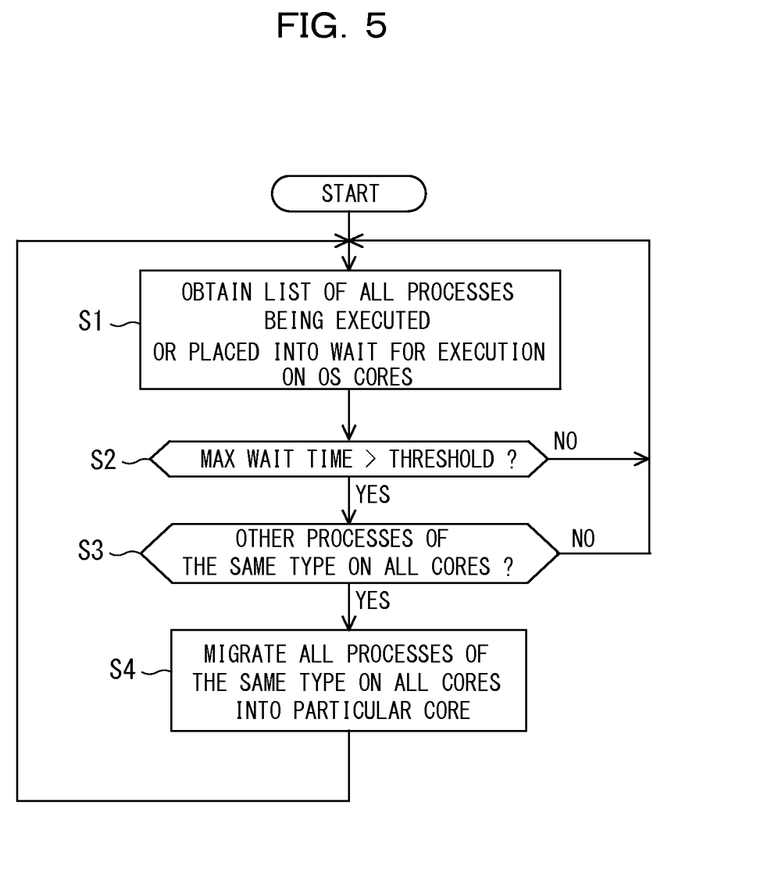
FIG. 5 is a flowchart illustrating an operation of the process relocation unit as an example of the first embodiment.

FIG. 5 is a flowchart (Steps S1 to S4) illustrating an operation of the process relocation unit 11, as an example of the first embodiment.

In Step S1, the process list obtaining unit 12 obtains a list of all processes that are being executed or placed into wait for execution on all of the OS cores 2 in the information processing apparatus 1.

Next, in Step S2, the wait time determining unit 13 determines whether or not there is any process having a maximum wait time exceeds a predetermined threshold, among all processes of the OS cores 2, based on the process creating time in the process list obtained by the process list obtaining unit 12 in Step S1.

If no wait time exceeds the predetermined threshold (refer to the NO route from Step S2), the flow returns to Step S1.

Otherwise, if any maximum wait time exceeds the predetermined threshold (refer to the YES route from Step S2), in Step S3, the migration determining unit 14 determines whether or not processes in the same type are present in all OS cores 2 (being executed or placed into wait for execution on all OS cores 2), based on the process list obtained by the process list obtaining unit 12 in Step S2.

If processes in the same type are not present in all OS cores 2 (refer to the NO route from Step S3), the flow returns to Step S1.

Otherwise, if processes in the same type are present in all OS cores 2 (refer to the YES route from Step S3), in Step S4, the process migrating unit 15 migrates all of the processes in that type to at least one particular OS core 2.

The flow then returns to Step S1, and Steps S1 to S4 described above are repeated.

As described above, in the process relocation unit 11 of as an example of the first embodiment, when processes in the same type are present in all OS cores 2, all of the processes in that type are migrated to at least one particular OS core 2.

Thereby, the OS cores 2 are prevented from being occupied by IO operations and the like, for a long time, thereby reserving resources required for the other processes (availability time for the OS cores 2). Furthermore, any delays caused by wait of any processes in particular type can be prevented.

In the example depicted in FIG. 3, if administration processes is delayed by IO processes.

As described above, one administration process is an alive confirmation process that confirms whether the OS cores 2, the computation core 3, the cache memory 4, and the main memory 5 (nodes) are alive or not, and communicates the status of each node to a monitoring unit in the operating system. If the alive confirmation process is placed into wait for execution for a long time, the monitoring unit in the operating system would determine that any of the nodes does not exist anymore.

In an example of this first embodiment, the process relocation unit 11 migrates the IO processes to at least one particular OS core 2. Thereby, the alive confirmation process is not placed into wait for execution in the other OS cores 2, and the monitoring unit in the operating system can know the accurate statuses of the nodes.

(B) Second Embodiment

In the above-described example of the first embodiment, processes migrated by the process migrating unit 15 continue to be run in the destination OS core(s) 2, until they are completed.

However, it may be desirable to execute some processes which are continuously run, such as daemon, and which have been migrated to particular OS core(s) 2, at the timing when the processing wait time for a process is reduced, for example.

For this reason, a process relocation unit 11' as an example of the second embodiment includes functions to allow a migrated process to be executed on other OS cores 2, in addition to the functions of the process relocation unit 11 of as an example of the first embodiment.

An information processing apparatus 1' as an example of the second embodiment has the same hardware configuration as that of above-described information processing apparatus 1 as an example of the first embodiment, and thus their illustration and description are omitted.

Figure 6:
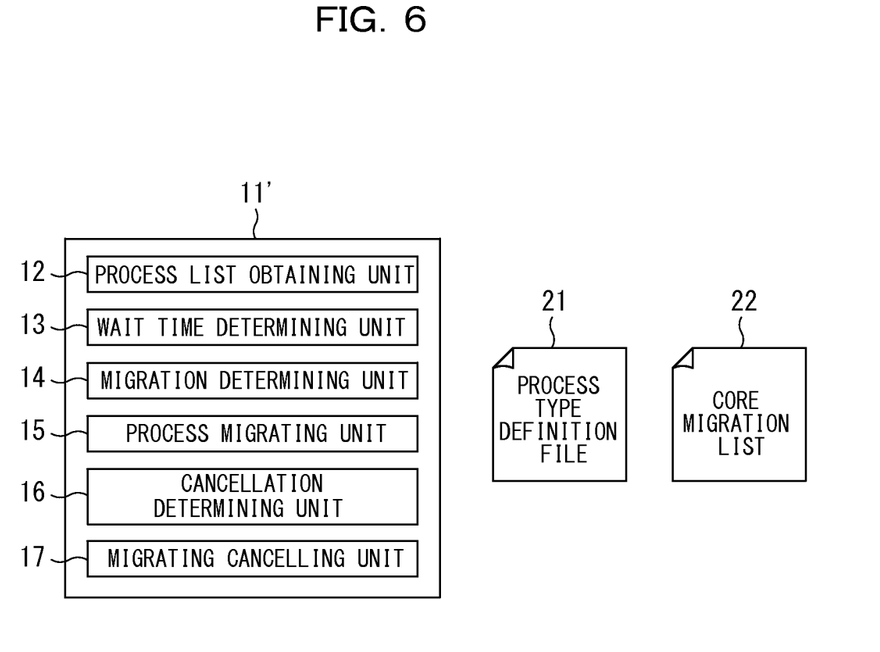
FIG. 6 is a diagram illustrating a functional configuration of a process relocation unit as an example of the second embodiment.

FIG. 6 is a diagram illustrating a functional configuration of a process relocation unit 11' as an example of the second embodiment.

The process relocation unit 11' as an example of the second embodiment has functions and configuration similar to those of the above-described the process relocation unit 11 of as an example of the first embodiment, except that a cancellation determining unit 16 and a migrating cancelling unit 17 are provided, and that a core migration list 22 is used. In the process relocation unit 11', since elements denoted by the same reference symbols as those of the aforementioned the process relocation unit 11 of as an example of the first embodiment include functions and/or configurations similar to the corresponding elements in the process relocation unit 11, and their descriptions are omitted.

The core migration list 22 stores information on processes that have been migrated between OS cores 2 by the process migrating unit 15.

The core migration list 22 stores IDs of migrated processes, the source OS cores 2, and destination OS cores 2, for example.

The core migration list 22 is stored in the main memory 5 (refer to FIG. 1), for example.

The cancellation determining unit 16 determines whether or not there is any processes that have been migrated to different OS core(s) 2 by the process migrating unit 15, based on the core migration list 22.

When there is any process whose maximum wait time is equal to or smaller than a predetermined threshold, and when the process migrating unit 15 determines that there is any processes that have been migrated to different OS core(s) 2, the migrating cancelling unit 17 sets to allow the processes that have been migrated by the process migrating unit 15, to be executed on other OS cores 2. When the operating system is Linux® that is widely used, commands for allowing the processes to be executed on other OS cores 2 include the taskset command for specifying a core for executing that process, or the smp affinity (set affinity) command for specifying the core to be interrupted. For example, the migrating cancelling unit 17 sets to allow the processes that have been migrated by the process migrating unit 15, to be executed on other OS cores 2, by executing the taskset command.

For example, the migrating cancelling unit 17 executes the taskset command while specifying a 2-bit parameter indicating an OS core 2 on which the process is to be executed. This 2-bit parameter can take the following values: 00 (not allowing any OS core 2 to execute the process), 01 (allowing execution to the OS core 2-1 only), 10 (allowing execution to the OS core 2-2 only), and 11 (allowing execution to every OS cores 2), for example.

In this manner, it is possible to allow the processes in the same type set for at least one particular OS core 2, to be executed on other OS cores 2.

Next, the processing by the process relocation unit 11' will be described in more detail with reference to a flowchart in FIG. 7.

Figure 7:
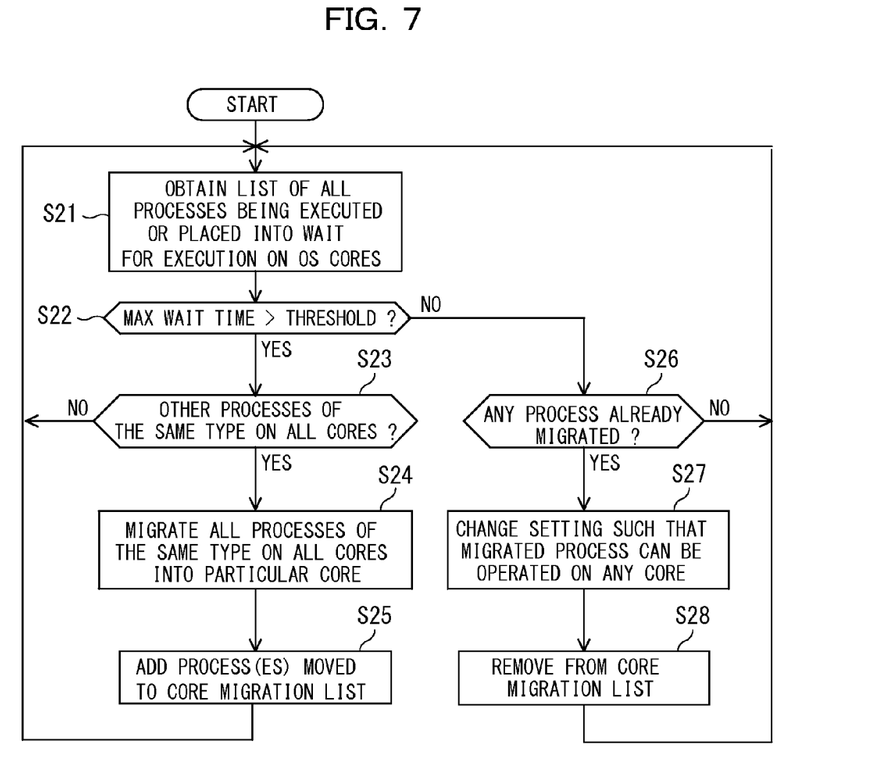
FIG. 7 is a flowchart illustrating an operation of the process relocation unit as an example of the second embodiment.

FIG. 7 is a flowchart (Steps S21 to S28) illustrating an operation of the process relocation unit 11' as an example of the second embodiment.

In Step S21, the process list obtaining unit 12 obtains a list of all processes that are being executed or placed into wait for execution on all of the OS cores 2 in the information processing apparatus 1.

Next, in Step S22, the wait time determining unit 13 determines whether or not there is any process having a maximum wait time exceeds a predetermined threshold, among all processes of the OS cores 2, based on the process creating time in the process list obtained by the process list obtaining unit 12 in Step S21.

If any maximum wait time exceeds the predetermined threshold (refer to the YES route from Step S22), in Step S23, the migration determining unit 14 determines whether or not processes in the same type are present in all OS cores 2 (being executed or placed into wait for execution on all OS cores 2), based on the process list obtained by the process list obtaining unit 12 in Step S22.

If no wait time exceeds the predetermined threshold (refer to the NO route from Step S23), the flow returns to Step S21.

Otherwise, if processes in the same type are present in all OS cores 2 (refer to the YES route from Step S23), in Step S24, the process migrating unit 15 migrates all of the processes in that type, to at least one particular OS core 2.

In Step S25, the process migrating unit 15 records the processes migrated in Step S24 to the core migration list 22, and the flow returns to Step S21.

Otherwise, if no wait time exceeds the predetermined threshold (refer to the NO route from Step S22), the flow returns to Step S21 in Step S26, the cancellation determining unit 16 determines whether or not there is any processes that have been migrated to different OS core(s) 2 by the process migrating unit 15, based on the core migration list 22.

If no process has been migrated to another OS core 2 (refer to the NO route from Step S26), the flow returns to Step S21.

Otherwise, if any process has been migrated to another OS core 2 (refer to the NO route from Step S26), in Step S27, the migrating cancelling unit 17 changes the setting to allow the processes that have been migrated by the process migrating unit 15 in Step S24, to be executed on other OS cores 2.

Next, in Step S28, the migrating cancelling unit 17 deletes the process for which setting has been modified in Step S27, and deletes the process from the core migration list 22. The flow then returns to Step S21.

In this example of the second embodiment, if the wait time for the process equals to or less than a threshold, and if there is any processes that have been migrated to different OS core(s) 2 by the process migrating unit 15, it is sets to allow the processes that have been migrated by the process migrating unit 15, to be executed on other OS cores 2.

Thereby, when the processing load for processes in a particular kind that have been migrated is reduced, it is possible to allow these processes to be executed on all OS cores, which helps to improve the speed for processing.

As a result, an example of the second embodiment has an advantageous effect the availability time of resources, i.e., the OS cores 2, can be utilized in a more suitable manner, in addition to the advantageous effects of the information processing apparatus 1 as an example of the first embodiment described above.

(C) Third Embodiment

In an example of the first and second embodiments, the computation cores 3 are configured similarly, and a main memory 5 and a cache 4 are shared among all computation cores 3.

In the meantime, in an information processing apparatus, it has been known that in general, the performance of the information processing apparatus may deteriorate, as the number of cores increases, due to the bandwidth for the cache memory and cache hits. This is caused by the fact that a single cache memory is used by a number of cores.

One approach to address this performance reduction is the non-uniform memory access (NUMA) architecture, where computation cores are grouped and a cache memory is provided to each group.

An example of a third embodiment supports a configuration where cache memories 4 are provided for computation cores 3.

Figure 8:
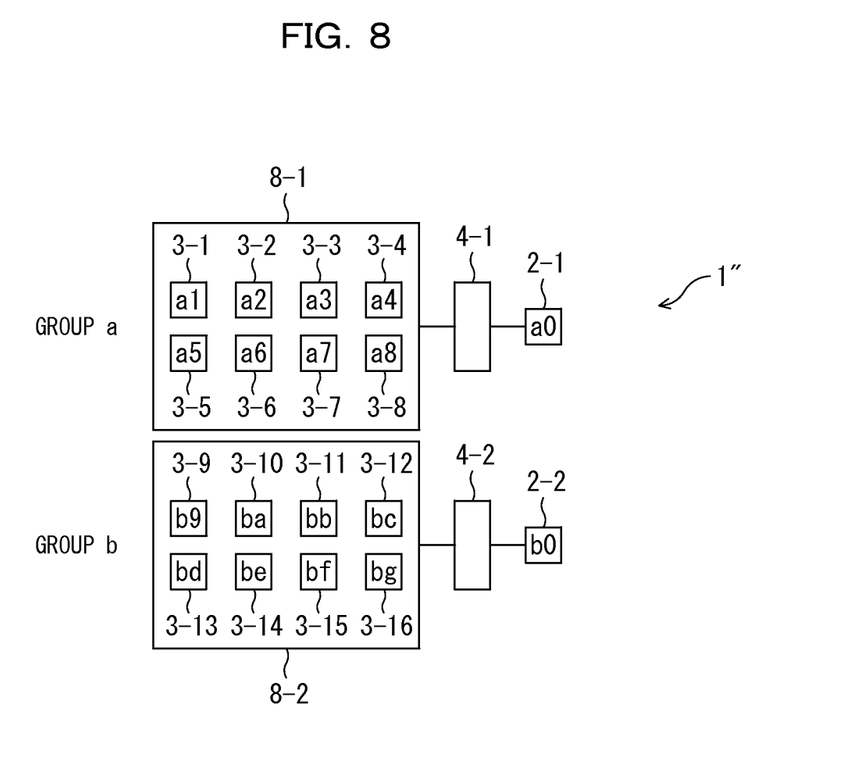
FIG. 8 is a diagram schematically illustrating a hardware configuration of an information processing apparatus as an example of the third embodiment.

FIG. 8 is a diagram schematically illustrating a hardware configuration of an information processing apparatus 1" as an example of the third embodiment.

The information processing apparatus 1" includes OS cores 2-1 and 2-2, computation cores 3-1 to 3-16, cache memories 4-1 and 4-2, and a main memory (not illustrated).

The information processing apparatus as an example of the third embodiment 1" has functions and configuration similar to those of the above-described the process relocation unit 11 of as an example of the first embodiment, except that two cache memories 4-1 and 4-2 are provide, and the computation cores 3-1 to 3-16 are grouped. An information processing apparatus 1" as an example of the third embodiment has the same hardware configuration as that of above-described information processing apparatus 1 as an example of the first embodiment, and thus their illustration and description are omitted.

The computation cores 3-1 to 3-8 (computation cores a1-a8) belong to a computation core group 8-1 (group a), and the computation cores 3-9 to 3-16 (computation cores a1-a8) belong to a computation core group 8-2 (group b). In the following descriptions and corresponding drawings, the computation cores 3-1 to 3-8 may also referred to as computation cores al-a8, and the computation cores 3-9 to 3-16 may also referred to as computation cores b9 and ba-bg, such that groups of the respective computation cores 3 are easily recognized.

Furthermore, the cache memory 4-1 is allocated for the computation core group 8-1, and the cache memory 4-2 is allocated for the computation core group 8-2.

Note that, hereinafter, when referring to a specific one of multiple OS cores, reference symbols 2-1 and 2-2 are used, whereas a reference symbol 2 is used when referring to any of OS cores.

Further, hereinafter, when referring to a specific one of multiple computation cores, reference symbols 3-1 to 3-16 are used, whereas a reference symbol 3 is used when referring to any of computation cores.

Further, hereinafter, when referring to a specific one of multiple cache memories, reference symbols 4-1 and 4-2 are used, whereas a reference symbol 4 is used when referring to any of multiple cache memories s.

The OS core 2-1 (OS core a0) shares the cache memory 4-1 with the computation cores 3-1 to 3-8. Processes (IO processes and the like), execution of which is requested by the computation cores 3-1 to 3-8 are queued in a queue for the OS core 2-1 (not illustrated).

The OS core 2-2 (OS core b0) shares the cache memory 4-2 with the computation cores 3-9 to 3-16. Processes (IO processes and the like), execution of which is requested by the computation cores 3-9 to 3-16 are queued in a queue for the OS core 2-2 (not illustrated).

Typically, an OS core 2 that shares a cache memory 4 with a computation core 3 requesting an execution of a process an, executes that process. For example, a process requested by the OS core 2-1 is executed by the computation core 3-1 which shares the cache memory 4-1 with the computation core 3-1. However, when the wait time for a process that is placed into wait in the OS cores 2 becomes too long and processes in a particular type are present in all OS cores 2, the process relocation unit as an example of the third embodiment 11" migrates the processes in that particular type, to at least one particular OS core 2.

Figure 9:
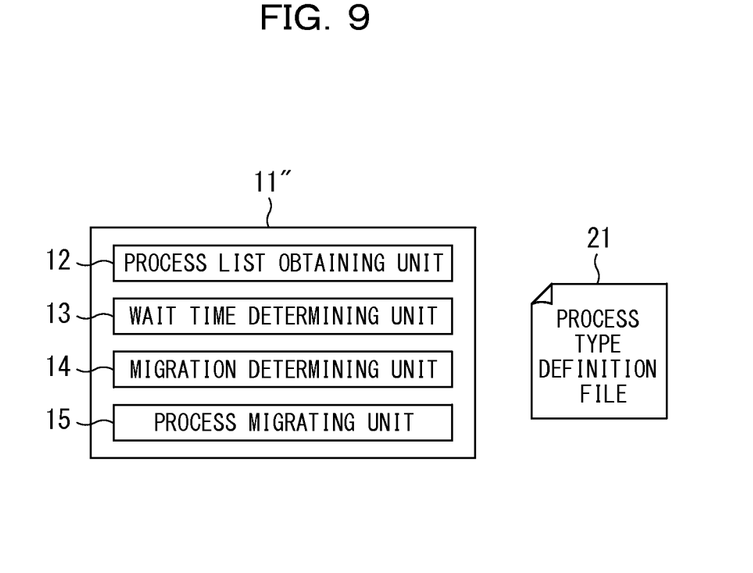
FIG. 9 is a diagram illustrating a functional configuration of a process relocation unit as an example of the third embodiment.

FIG. 9 is a diagram illustrating a functional configuration of a process relocation unit 11" as an example of the third embodiment.

The process relocation unit as an example of the third embodiment 11" as an example of the third embodiment has functions and configuration similar to those of the above-described the process relocation unit 11 of as an example of the first embodiment, except that a cancellation determining unit 16, and their descriptions are omitted.

Now, process migration processing by the process relocation unit 11" will be described with reference to FIGS. 10 and 11.

Figure 10:
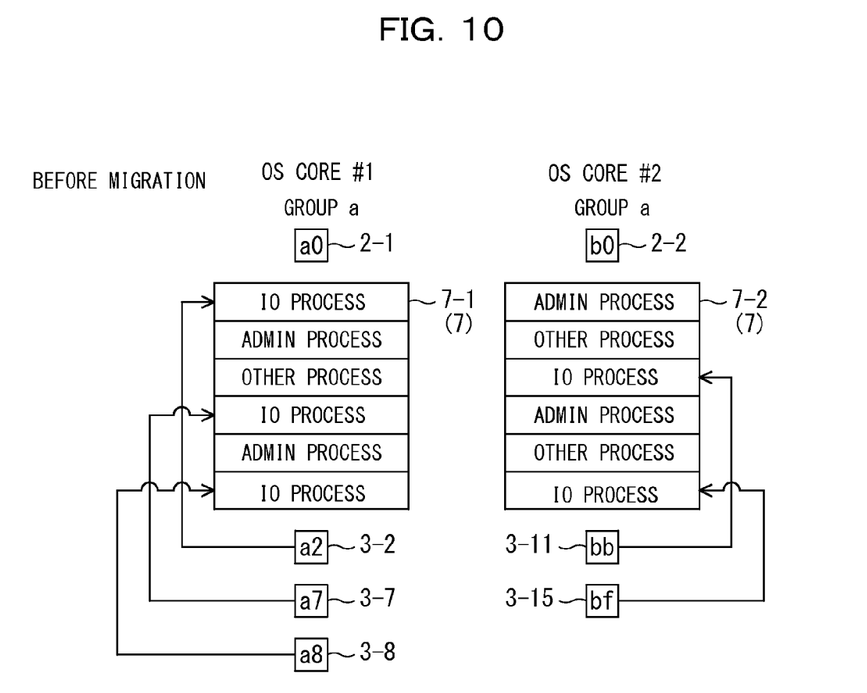
FIG. 10 is a diagram illustrating an example of the status prior to processing by the process relocation unit as an example of the third embodiment.

FIG. 10 is a diagram illustrating an example of the status prior to processing by the process relocation unit 11" as an example of the third embodiment. FIG. 11 is a diagram illustrating an example of the status after the processing by the process relocation unit 11" as an example of the third embodiment.

Figure 11:
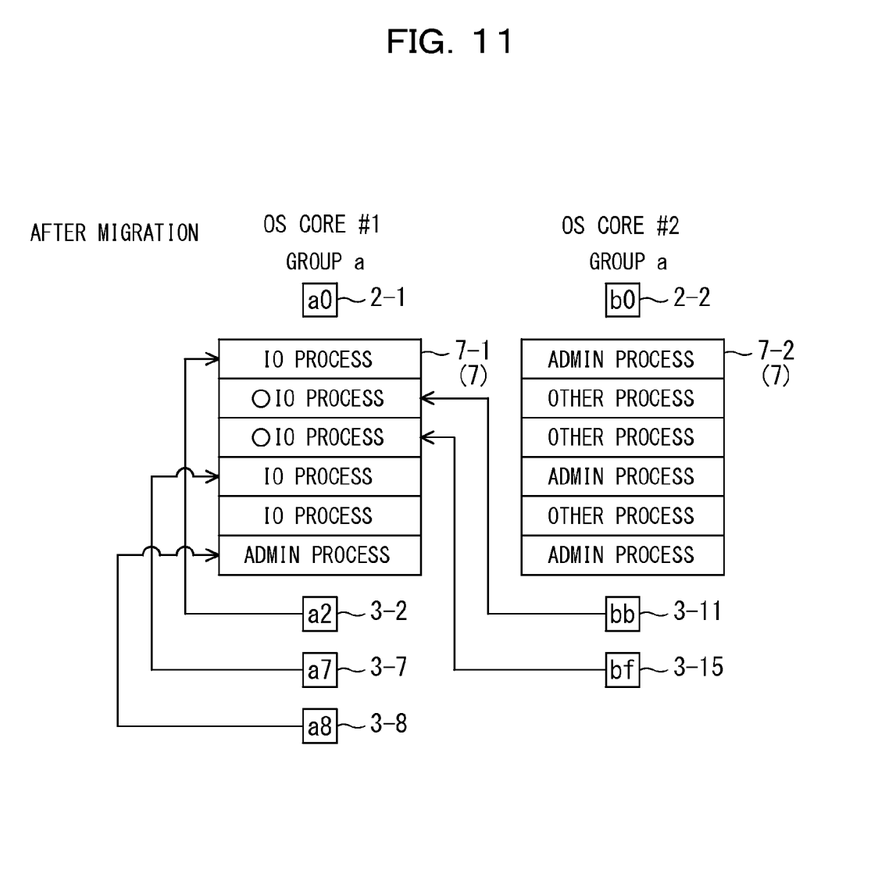
FIG. 11 is a diagram illustrating an example of the status after the processing by the process relocation unit as an example of the third embodiment.

In FIGS. 10 and 11, the OS cores 2-1 and 2-2, and the corresponding process lists 7-1 and 7-2 are illustrated.

Here, the process lists 7-1 and 7-2 are depicted merely for the purpose of illustration, and are illustrated not the ones actually generated by the OS cores 2-1 and 2-2.

In the process lists 7-1 and 7-2, the processes listed on the top are the processes that are being executed on the OS cores 2-1 and 2-2. The second and subsequent processes on the list are processes that are placed into wait for execution, arranged in the descending order of the creation date and time of the processes.

In the example in FIGS. 10 and 11, by the process relocation unit 11", a IO process (which are encircled in FIG. 11) requested by the computation core 3-11 (computation core bb) and the computation core 3-15 (computation core bf) belonging to the computation core group b is migrated to the OS core 2-1.

The process migrating unit 15 determines the destination OS core(s) 2 for the process. For example, the process migrating unit 15 selects OS core(s) 2 in which a greater number of processes are being executed, as a destination OS core(s) 2 for the process.

In the example in FIG. 10, three and two IO processes are being executed the OS cores 2-1 and 2-2, respectively, and the process migrating unit 15 selects the OS core 2-1 as destination of the IO processes (in other words, the operating system process on the OS core 2-2 is to be migrated).

In an example of the third embodiment, in addition to the advantageous effects of the information processing apparatuses 1 and 1" as an example of the first and second embodiments, additional advantage is achieved, in this technique is applicable to a NUMA configuration.

Note that in the example in FIGS. 10 and 11, the computation cores 3 (bb and bf) where IO processes are migrated use the cache memory 4-2, which is different from the cache memory 4-1 used by the OS core 2-1 (a0). The migration may adversely affects the cache performance. However, processes that have been placed into wait for execution are executed without being waited on the OS core 2-2 (b0), the overall improvement of the performance of the information processing apparatus 1" overrides the reduction in the cache performance.

(D) Miscellaneous

Note that the present disclosure is not limited to the embodiments described above, and various modifications may be made without departing from the spirit of the present disclosure.

For example, although three types of processes, i.e., "IO process", "administration process", and "other processes" are used in an example of the above-described first to third embodiments, any other process types may be used.

Furthermore, examples of the above-described second third embodiments may be combined.

Note that a program (control program) for implementing the functions as the process relocation units 11, 11', and 11", the process list obtaining unit 12, the wait time determining unit 13, the migration determining unit 14, the process migrating unit 15, the cancellation determining unit 16, and the migrating cancelling unit 17 described above, are provided in the form of programs recorded on a computer read able recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu-ray disc, a magnetic disk, an optical disk, a magneto-optical disk, or the like. The computer (the information processing apparatuses 1 and 1") then reads a program from that storage medium using a medium reader (not illustrated) and uses that program after transferring it to an internal storage apparatus or external storage apparatus or the like. Alternatively, the program may be recoded on a storage unit (storage medium), for example, a magnetic disk, an optical disk, a magneto-optical disk, or the like, and the program may be provided from the storage unit to the computer (the information processing apparatuses 1 and 1") through a communication path.

Upon embodying the functions as the process relocation units 11, 11', and 11", the process list obtaining unit 12, the wait time determining unit 13, the migration determining unit 14, the process migrating unit 15, the cancellation determining unit 16, and the migrating cancelling unit 17, the program (storage management program) stored in an internal storage apparatuses (a HDD (not illustrated) in the information processing apparatuses 1 and 1", in the present embodiments) is executed by a microprocessor of the computer (the OS cores 2 in the information processing apparatuses 1 and 1" in the present embodiments). In this case, the computer (the information processing apparatuses 1 and 1" in the present embodiments) may alternatively read a program stored in a storage medium for executing it.

In accordance with the disclosed technique, resources can be prevented from being occupied by processes in a particular type, in an information processing apparatus.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A computing apparatus comprising:
a plurality of processor cores adapted to execute processes of different process types;
a processing state information obtaining unit that obtains a list of all processes being executed and processes that have been queued for later execution on the plurality of processor cores; and
a processing migrating unit that, when there is any process among the processes that have been queued having a longest wait time exceeding a predetermined value and when a predetermined number of processes of a particular process type among the different process types have been queued in all of the plurality of processor cores, causes all processes of the particular process type to be executed on a particular processor core of the plurality of processor cores by moving all of the processes of the particular process type to a single execution queue of the particular processor core, wherein the processes of the particular process type in the single execution queue are arranged in descending order of their creation time.

2. The computing apparatus according to claim 1, further comprising a migrating cancelling unit that, when there is any process among the processes that have been queued having the longest wait time being equal to or smaller than the predetermined value and there are one or more processes which have been moved to the single execution queue by the processing migrating unit to be executed on the particular processor core, causes the one or more processes which have been moved to the single execution queue by the processing migrating unit to be executed on any processor core among the plurality of processor cores by moving the one or more processes to an execution queue of that processor core, wherein the one or more processes in the execution queue are arranged in descending order of their creation time.

3. The computing apparatus according to claim 1, wherein the computing apparatus further comprises a plurality of additional processor cores, wherein each of the additional processor cores executes processes differently than processes executed by the plurality of processor cores.

4. The computing apparatus according to claim 3, wherein the plurality of additional processor cores are grouped into a plurality of groups, and one of the plurality of additional processor cores and a discrete cache memory are allocated for each of the plurality of groups.

5. A method of controlling a computing apparatus comprising a plurality of processor cores adapted to execute processes of different process types, the method comprising:
    obtaining a list of all processes being executed and processes that have been queued for later execution on the plurality of processor cores; and
    when there is any process among the processes that have been queued having a longest wait time exceeding a predetermined value and when a predetermined number of processes of a particular process type among the different process types have been queued in all of the plurality of processor cores, causing all processes of the particular process type to be executed on a particular processor core of the plurality of processor cores by moving all of the processes of the particular process type to a single execution queue of the particular processor core, wherein the processes of the particular process type in the single execution queue are arranged in descending order of their creation time.

6. The method according to claim 5, further comprising, when there is any process among the processes that have been queued having the longest wait time being equal to or smaller than the predetermined value and there are one or more processes which have been moved to the single execution queue by the processing migrating unit to be executed on the particular processor core, causes the one or more processes which have been moved to the single execution queue by the processing migrating unit to be executed on any processor core among the plurality of processor cores by moving the one or more processes to an execution queue of that processor core, wherein the one or more processes in the execution queue are arranged in descending order of their creation time.

7. A non-transitory computer-readable storage medium having a program for controlling a computing apparatus stored therein, the program causes a computing apparatus comprising a plurality of processor cores adapted to execute processes of different process types to:
    obtain a list of all processes being executed and processes that have been queued for later execution on the plurality of processor cores; and
    when there is any process among the processes that have been queued having a longest wait time exceeding a predetermined value and when a predetermined number of processes of a particular process type among the different process types have been queued in all of the plurality of processor cores, cause all processes of the particular process type to be executed on a particular processor core of the plurality of processor cores by moving all of the processes of the particular process type to a single execution queue of the particular processor core, wherein the processes of the particular process type in the single execution queue are arranged in descending order of their creation time.

8. The non-transitory computer-readable storage medium according to claim 7, wherein the program causes the computing apparatus comprising a plurality of processor cores to, when there is any process among the processes that have been queued having the longest wait time being equal to or smaller than the predetermined value and there are one or more processes which have been moved to the single execution queue by the processing migrating unit to be executed on the particular processor core, causes the one or more processes which have been moved to the single execution queue by the processing migrating unit to be executed on any processor core among the plurality of processor cores by moving the one or more processes to an execution queue of that processor core, wherein the one or more processes in the execution queue are arranged in descending order of their creation time.

* * * * *